United States Patent Office 3,249,472
Patented May 3, 1966

3,249,472
SOLDER FLUXES
Harry B. Laudenslager, Jr., Jamestown, N.Y., assignor to
Blackstone Corporation, Jamestown, N.Y.
No Drawing. Filed Oct. 31, 1963, Ser. No. 320,512
6 Claims. (Cl. 148—23)

This invention relates to solder fluxes and, particularly, to a solder flux for soft solders and the like. There are a great many soldering applications which require a solder flux having the ability to flow into restricted areas (commonly called "capillarity") and to cause solder to flow into the same restricted areas with good setting and bonding properties. Among such applications are the forming of tubing for automotive radiator cores and the making of cans and the like. A soldering flux to be satisfactory for such applications must be readily washed away after soldering has been completed. It must inhibit oxide formation while in place on the material being soldered. It must be nontoxic, produce a minimum of corrosive products, have good fluxing properties over a wide range of temperatures and have a good spread value. Heretofore, acid chloride fluxes have been generally used in such applications. These usual chloride fluxes require large amounts of cleaning equipment, steam, hot water and time in order to assure complete removal of the fluxes after soldering has been completed. Great difficulty has been experienced in the past by the residue from such fluxes corroding the metal surfaces and attacking and destroying paint coatings applied thereto after the usual cleaning operation. As a result, the chloride fluxes heretofore used have been expensive to handle and remove after the soldering operation was complete and, even after painstaking cleaning operations there was no assurance that the fluxes had been entirely removed.

A very serious problem in the soldering art is that of soldering to corroded or oxidized iron or steel, galvanized steel or galvanneal steel. No flux presently known to me is successful other than the flux of present invention in fluxing oxidized iron and steel surfaces, galvanized steel surfaces or the newer galvanneal.

I have discovered a soldering flux composition which eliminates all of the difficulties characteristic of the chloride fluxes heretofore used. I have discovered a flux composition which is readily soluble in water, has excellent spread characteristics, and is easily removed after completion of the soldering operation. The residue from my flux composition, remaining after the soldering operation, is readily soluble, has very little corrosive action, is non-toxic, easy to handle and non-hygroscopic. In addition, the flux of my invention has very high capillarity and causes the solder to flow into a joint being soldered much more rapidly and smoothly than is the case with the ordinary chloride fluxes of which zinc chloride flux is representative. Finally, the flux composition of this invention will successfully permit soldering of oxidized steel surfaces without prior cleaning and will flux galvanized steel surfaces and galvanneal to permit their being soldered. This ability to flux oxidized surfaces and galvanized surfaces is most unusual and permits the use of solder joints without the need for previous removal of the oxide film or galvanized coating as has been necessary in the past.

I have discovered a soldering flux composed of the reaction product of hydrogen chloride with the reaction product of an organic amine with hydroxyacetic acid, either alone or with a wetting agent, preferably, in an aqueous solution.

Preferably, the flux of my invention contains more than about 4% of the reaction product of hydrogen chloride reacted with the reaction product of an organic amine and hydroxyacetic acid in aqueous solution. However, I may use smaller amounts down to about 1% with a reduction in effectiveness. Preferably I include about 0.1% to 0.8% of a wetting agent.

Preferably, the reaction product of the organic amine and hydroxyacetic acid is formed by reacting one mol of amine with one mol of hydroxyacetic acid. This product is then reacted with HCl by bubbling HCl gas through the melted product.

The invention will perhaps be better understood by referring to the following examples:

EXAMPLE I

A reaction product of monoethanolamine and hydroxyacetic acid was prepared by slowly adding one mol of hydroxyacetic acid to one mol of monoethanolamine in an ice bath. The material was held at a temperature below 55° C. and was agitated slowly. A reaction product in the form of water soluble crystals was recovered. These crystals had a melting point of about 186°–190° F., a boiling point of about 315–335° F., and a decomposition temperature of about 575°±10° F. On analysis the crystals showed 9.58% nitrogen and 33.05% carbon. About 104 B.t.u. of heat per lb. of reaction product was produced by the reaction.

This reaction product was melted and hydrogen chloride was bubbled through the molten mass without further addition of heat. The heat of reaction raised the temperature to about 280°–290° F. Hydrogen chloride was continued to be bubbled until acid fumes came over the top of the reflux condenser.

The analysis of the resulting reaction product was:

|  | Percent |
| --- | --- |
| Free Cl | 17.0 |
| Carbon | 29.9 |
| Nitrogen | 7.3 |

The freezing point of this product was below −87° C. No boiling point was determinable because of the decomposition of the product. The product is very stable. A check of pH over a period of six weeks on a 1.28% solution in water showed no change in pH.

Spread tests made according to the ASTM Spread Test, Special Publication 189, were made on the product before and after washing and at various concentrations. The results appear in Table I.

Table 1

| Solution | (5/1/63) | Pure #1 | Impure #2 |
| --- | --- | --- | --- |
| 1.0% | 59.3 | 74.0 | 43.6 |
| 2.5% | 88.4 | 89.3 | 89.8 |
| 3.0% | 90.0 | 87.6 | 89.3 |
| 4.0% | 89.9 | 89.7 | 90.3 |
| 5.0% | 91.3 | 90.0 | 91.3 |
| 7.5% | 90.9 | 90.9 | 90.6 |
| 10.0% | 91.1 | 90.2 | 91.0 |
| Conc. | 95.9 | 94.8 | 94.9 |

EXAMPLE II

Monoethanolamine was reacted with 70% hydroxyacetic acid in the ratio of 1:1 without added $H_2O$. Water was removed by heating to a maximum of 150° F. under vacuum. The crystals were collected. Hydrogen chloride was bubbled into this reaction product as in Example I with like results.

EXAMPLE III

Monoethanolamine was reacted with 70% hydroxyacetic acid in the ratio of 1:1 without added $H_2O$. The reaction solution was cooled to 60° F. and seeded with previously obtained crystals of the reaction product of monoethanolamine and hydroxyacetic acid. The crystals were filtered in a Nutsche filter, collected and melted and reacted with HCl as in Example I with like results.

Preferably the flux of this invention is mixed with $H_2O$ and wetting agent such as 0.2% of aliphatic polyoxyethylene ether alcohols. It may be mixed with glycols in ratio up to 1:1 to improve its staying power.

The flux of this invention was used in 4% solution in water to solder radiator cores. No leaks appear in 20,000 cycles under a standard radiator cycling test.

A comparison of cycling tests of radiators soldered using 4% of the flux of this invention in $H_2O$ against a regular production flux showed that no leaks developed after 20,000 cycles under a standard radiator cycling test whereas with the regular production flux, the average leak began at 16,323 cycles.

Various wetting agents such as the higher sodium alkyl sulfates, aliphatic polyoxyethylene ether alcohol and others may be used with the flux of this invention.

While I have illustrated and described certain present preferred embodiments of my invention, it will be understood that this invention may be otherwise embodied within the scope of the following claims.

I claim:

1. As a solder flux, the reaction product of hydrogen chloride reacted with the reaction product of an organic amine with hydroxyacetic acid at a temperature above the melting point of the reaction product of the amine and hydroxyacetic acid.

2. As a solder flux, the reaction product of hydrogen chloride reacted with the reaction product of one mol of organic amine with one mol of hydroxyacetic acid at a temperature above the melting point of the reaction product of the amine and hydroxyacetic acid.

3. A solder flux composition consisting essentially of about 1% to 15% of the reaction product of hydrogen chloride reacted with the reaction product of an organic amine with hydroxyacetic acid at a temperature above the melting point of the reaction product of the amine and hydroxyacetic acid, about 0.1% to 0.8% of a wetting agent and the balance water.

4. A solder flux composition as claimed in claim 3 wherein the organic amine is ethanolamine.

5. A solder flux composition as claimed in claim 2 wherein the organic amine is ethanolamine.

6. A solder flux composition consisting essentially of about 4% of the reaction product of hydrogen chloride reacted with the reaction product of one mol of ethanolamine with one mol of hydroxyacetic acid at a temperature above the melting point of the reaction product of the ethanolamine and hydroxyacetic acid, about 0.2% of a wetting agent and the balance water.

References Cited by the Examiner

UNITED STATES PATENTS

| | | | |
|---|---|---|---|
| 1,838,370 | 12/1931 | Dean et al. | 148—23 |
| 1,949,916 | 3/1934 | McQuaid | 148—23 |
| 2,291,400 | 7/1942 | Miller | 148—23 |
| 2,756,497 | 7/1956 | Gale | 148—23 |
| 2,880,125 | 3/1959 | Jordan et al. | 148—23 |
| 3,099,590 | 7/1963 | Laudenslager | 148—23 |

DAVID L. RECK, Primary Examiner.

DONALD L. WALTON, C. M. SCHUTZMAN, HIROSHI F. SAITO, Assistant Examiners.